C. P. CASS & H. A. WAHLERT.
AIR BRAKE CYLINDER ATTACHMENT.
APPLICATION FILED OCT. 28, 1909.
947,541.
Patented Jan. 25, 1910.
3 SHEETS—SHEET 2.
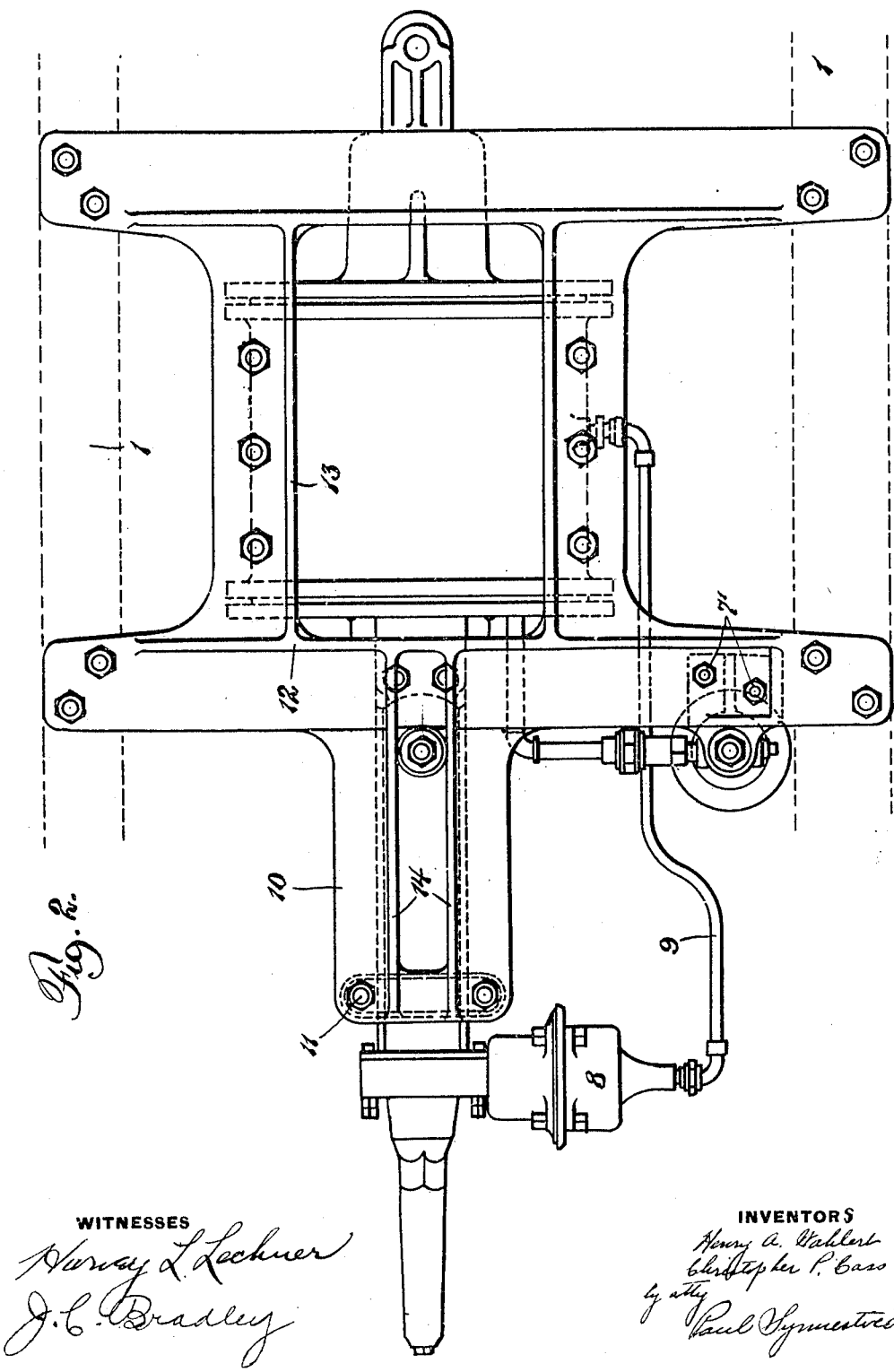

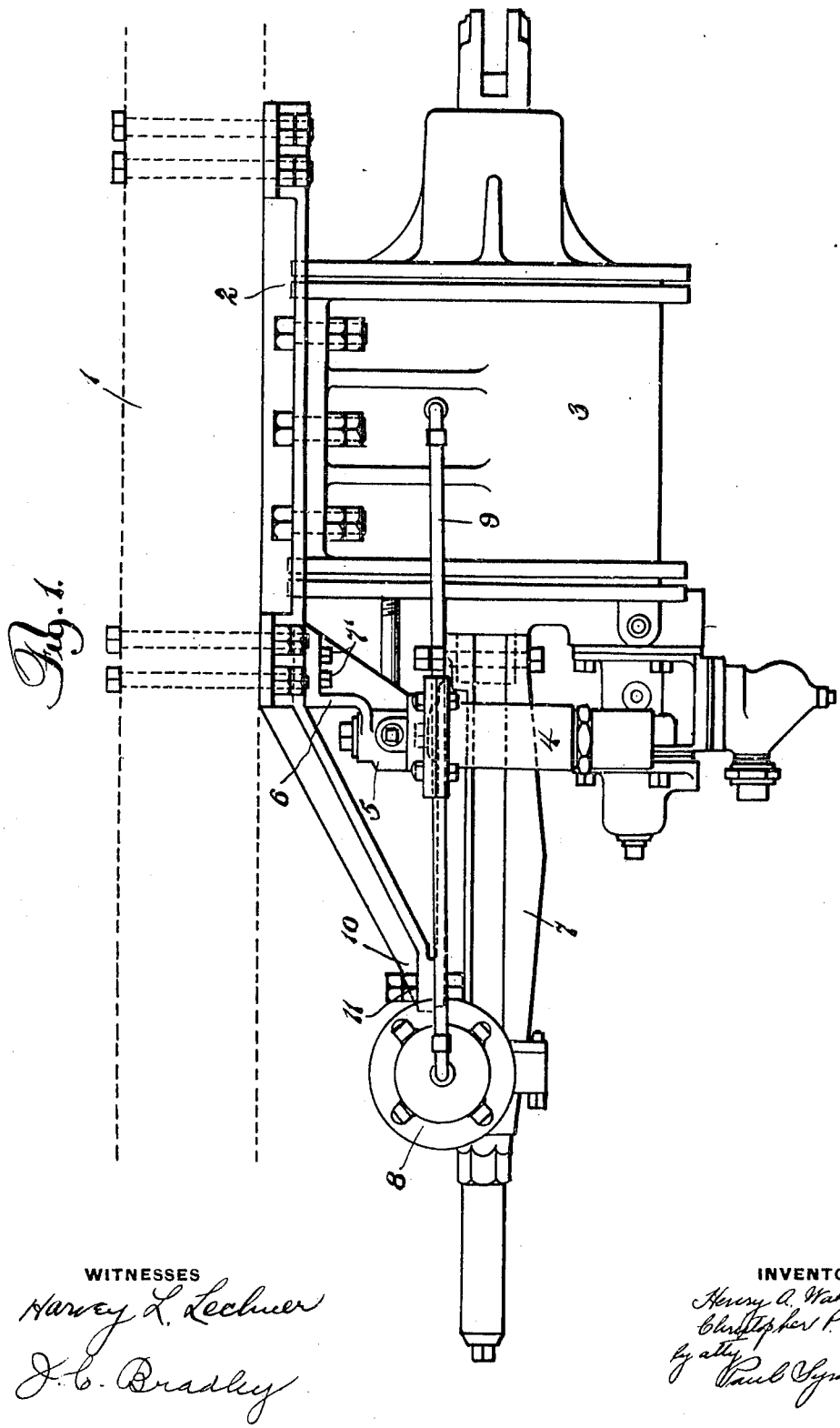

C. P. CASS & H. A. WAHLERT.
AIR BRAKE CYLINDER ATTACHMENT.
APPLICATION FILED OCT. 28, 1909.
947,541.
Patented Jan. 25, 1910.
3 SHEETS—SHEET 3.
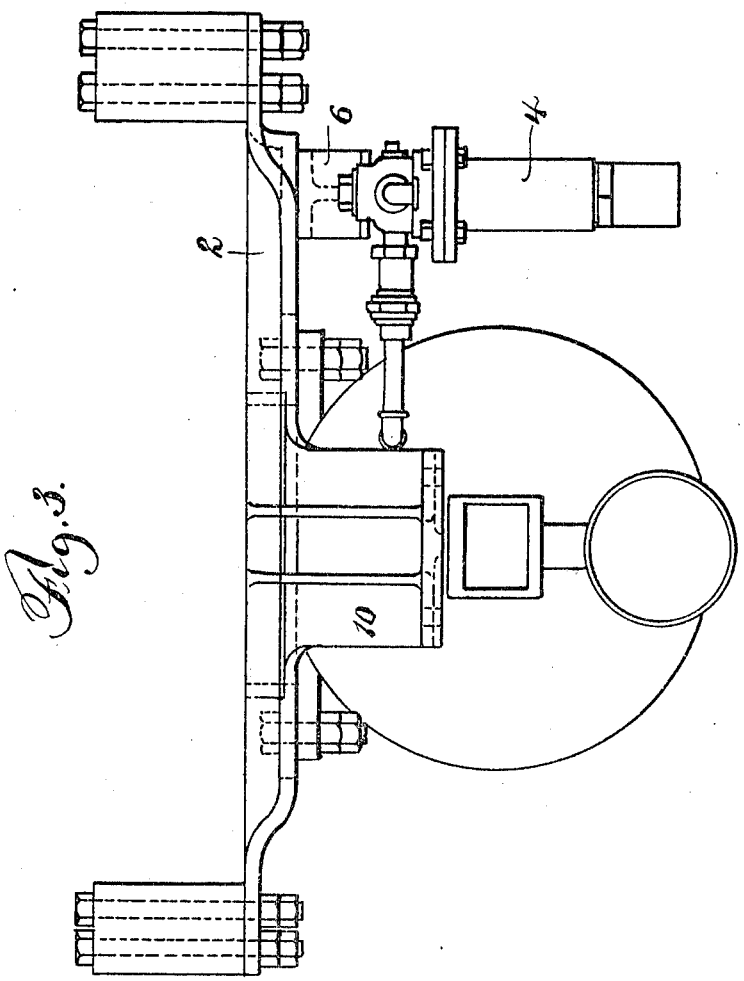
WITNESSES
INVENTORS

UNITED STATES PATENT OFFICE.

CHRISTOPHER P. CASS, OF MAPLEWOOD, AND HENRY A. WAHLERT, OF ST. LOUIS, MISSOURI.

AIR-BRAKE-CYLINDER ATTACHMENT.

947,541.  Specification of Letters Patent. Patented Jan. 25, 1910.

Application filed October 28, 1909. Serial No. 525,058.

*To all whom it may concern:*

Be it known that we, CHRISTOPHER P. CASS and HENRY A. WAHLERT, citizens of the United States, residing at Maplewood and St. Louis, Missouri, respectively, have invented certain new and useful Improvements in Air-Brake-Cylinder Attachments, of which the following is a specification.

The invention relates to the attachment for supporting a brake cylinder and coöperating parts. It has for its objects; the provision of an attachment or support constructed to support the brake cylinder and rigidly brace and maintain the slack adjuster in fixed relation to the brake cylinder; and to provide an improved supporting means for the brake cylinder, slack adjuster and high speed reducing valve. One embodiment of the invention is illustrated in the accompanying drawings, wherein:—

Figure 1 is a side elevation of the support or bracket, with the brake cylinder slack adjuster and high speed reducing valve secured thereto, Figure 2 is a top plan view of the apparatus, the under framing of the car to which the support is secured being shown in dotted lines, and Figure 3 is a front end view of the apparatus with the slack adjuster mechanism removed.

Referring first to the general arrangement of parts; 1—1 are the beams constituting a portion of the under framing of the car; 2 is a supporting bracket or attachment which is bolted to the beams 1—1 in the manner indicated; 3 is the brake cylinder bolted to the member 2; 4 is the high speed reducing valve, the head 5 of which is provided with a bracket 6 secured to the under side of the casting 2 by means of the bolts 7'; 7 is the supporting frame or bracket of the slack adjuster, which member is bolted at its inner end to the head of the brake cylinder and carries at its outer end the operating cylinder 8 connected to the brake cylinder by means of the pipe 9; and 10 is a bracket integral with the member 2 and secured at its front end to the slack adjuster support 7 by means of the bolts 11.

The member 2 is preferably made in the skeleton form indicated in Figure 2, its upper surface being stiffened by means of the ribs 12 and 13. The brace or bracket 10 extends downwardly from the front edge of the plate or member 2, and is provided upon its upper surface with the pair of stiffening ribs 14. The brace 10 not only serves to steady the slack adjuster frame, but also serves to maintain the frame in fixed position with respect to the brake cylinder 3, so that there is no relative shifting and no disturbance of the connections between these parts. The plate 2 and brace 10 are preferably made in the form of an integral steel casting, which casting can be very cheaply and rigidly formed, thus avoiding the necessity of a plurality of independent parts. The means for securing the high speed reducing valve 4 to the casting 2 is also advantageous in that the head 5 and bracket 6 are cast in a single piece and when the bracket 6 is bolted to the casting 2, the valve is securely maintained in position with respect to the brake cylinder, and there is no possibility of a disturbance of the connections between these parts due to a relative shifting thereof.

Having thus described our invention and illustrated its use, what we claim as new and desire to secure by Letters Patent is the following:—

1. Supporting means for an air brake cylinder and slack adjuster, comprising a main body portion adapted to support the cylinder and a projecting brace adapted to engage the slack adjuster.

2. An integral supporting casting for an air brake cylinder and slack adjuster, comprising a body portion adapted to be secured to the car framing and carry the brake cylinder, and a laterally and downwardly projecting brace adapted to be secured to the slack adjuster and maintain such slack adjuster in fixed position with respect to the brake cylinder.

3. The combination with a brake cylinder and slack adjuster supported from the head of the brake cylinder, of an attachment comprising a casting secured to the car framing and to the brake cylinder and provided with a laterally and downwardly projecting brace secured to the slack adjuster.

4. The combination with a brake cylinder and slack adjuster supported from the head of the brake cylinder, of a ribbed plate secured to the car framing and carrying the brake cylinder and provided with a brace for engaging the slack adjuster.

5. The combination with an air brake cylinder and a supporting plate therefor, of a high speed reducing valve comprising a cylinder at the side of the brake cylinder, and a head for the cylinder comprising a bracket secured to the said plate.

6. An integral supporting casting for an air brake cylinder and slack adjuster, comprising a body portion adapted to be secured to the car framing and to carry the brake cylinder, and a diagonal brace extending downwardly from the end of the body portion and adapted to be secured to the slack adjuster and maintain such slack adjuster in fixed position with respect to the brake cylinder.

In testimony whereof we have hereunto signed our names in the presence of the two subscribed witnesses.

CHRISTOPHER P. CASS.
HENRY A. WAHLERT.

Witnesses as to C. P. Cass:
J. M. DAPRON,
DAVID BAILEY.

Witnesses as to H. A. Wahlert:
F. M. VINCENT,
W. M. PERRY.